(12) United States Patent
Kodama et al.

(10) Patent No.: US 8,976,487 B2
(45) Date of Patent: Mar. 10, 2015

(54) ROTATING DEVICE WITH REDUCED THICKNESS AND DRIVING UNIT WITH IMPROVED BASE STRENGTH

(71) Applicant: Samsung Electro-Mechanics Japan Advanced Technology Co., Ltd., Shizuoka (JP)

(72) Inventors: Mitsuo Kodama, Shizuoka (JP); Taketo Nonaka, Shizuoka (JP); Masafumi Mizuno, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 0 days.

(21) Appl. No.: 14/074,331

(22) Filed: Nov. 7, 2013

(65) Prior Publication Data
US 2014/0139949 A1 May 22, 2014

(30) Foreign Application Priority Data

Nov. 20, 2012 (JP) .................................. 2012-254095

(51) Int. Cl.
*G11B 17/02* (2006.01)
*G11B 19/20* (2006.01)
(52) U.S. Cl.
CPC ................................ *G11B 19/2045* (2013.01)
USPC ....................................................... 360/99.08

(58) Field of Classification Search
USPC ................................. 360/98.07, 99.04, 99.08
See application file for complete search history.

(56) References Cited

U.S. PATENT DOCUMENTS

| 5,483,113 | A  | * | 1/1996 | Sakuragi et al. ............. 310/67 R |
|---|---|---|---|---|
| 2006/0072242 | A1 | * | 4/2006 | Tamaoka ................... 360/99.08 |
| 2007/0079499 | A1 | * | 4/2007 | Neal et al. .................. 29/603.03 |
| 2010/0238590 | A1 | * | 9/2010 | Tashiro et al. ............. 360/99.08 |
| 2011/0043948 | A1 |   | 2/2011 | Watanabe et al. |

FOREIGN PATENT DOCUMENTS

| JP | H04-006174 | 1/1992 |
|---|---|---|
| JP | 2012172781 A | 9/2012 |

\* cited by examiner

*Primary Examiner* — Joseph Feild
*Assistant Examiner* — Gustavo Polo
(74) *Attorney, Agent, or Firm* — Blank Rome LLP

(57) ABSTRACT

A rotating device comprises: a hub on which a magnetic recording disk is to be mounted; a base configured to rotatably support the hub via a bearing; a shaft configured such that it extends along the rotational axis of the hub; and a chassis arranged such that it faces the magnetic recording disk, and configured to have a Young's modulus that is smaller than that of the base. A base hole is provided to the upper face of the chassis that faces the magnetic recording disk such that it extends along the rotational axis. Furthermore, the base is fitted into the base hole, thereby fixedly mounting the base on the chassis.

20 Claims, 4 Drawing Sheets

ROTATING DEVICE WITH REDUCED THICKNESS AND DRIVING UNIT WITH IMPROVED BASE STRENGTH

REFERENCE TO RELATED APPLICATION

The present application claims priority to Japanese Patent Application No. 2012-254095, filed Nov. 20, 2012, whose disclosure is hereby incorporated by reference in its entirety into the present disclosure.

BACKGROUND OF THE INVENTION

1. Field of the Invention

The present invention relates to a rotating device configured to rotationally drive a magnetic recording disk.

2. Description of the Related Art

Progress is being made in reducing the size and increasing the data capacity of a disk driving apparatus such as a hard disk drive. Such a disk driving apparatus is mounted in various kinds of electronic devices. In particular, progress is being made in mounting such a disk driving apparatus in portable electronic devices such as laptop personal computers, portable music players, and so forth.

In recent years, remarkable progress has been made in reducing the thickness of portable electronic devices. This has led to a demand for further reducing the thickness of a disk driving apparatus. The present applicant has proposed a rotating device configured to meet such a demand for reducing the thickness of such a disk driving apparatus, as described in Japanese Patent Application Laid Open No. 2012-172781, for example.

SUMMARY OF THE INVENTION

In order to mount a laminated core and a bearing, and in order to suppress vibration, a base of a driving unit configured to rotationally drive a magnetic recording disk, which is a component of such a rotating device, is required to have a greater strength than the other components of a casing. In a case in which such a casing and a base are monolithically configured as described in Patent document 1, if they are monolithically configured to have a reduced thickness, in order to satisfy the strength required for the base portion, there is a need to configure such a base portion to have a greater thickness than that of the other portions of the casing. Even under normal circumstances, the base portion tends to have a large thickness due to the existence of a hub, bearing, and magnetic driving unit. If there is a need to further increase the thickness of the base portion in order to maintain the strength of the base portion, such a base portion having an increased thickness leads to a bottleneck in reducing the thickness of such a rotating device.

Such a problem is not restricted to such a disk driving apparatus. Rather, various kinds of rotating devices can have such a problem.

The present invention has been made in view of such a situation. Accordingly, it is a general purpose of the present invention to provide a rotating device configured to have a reduced thickness while maintaining or improving the strength of a base of a driving unit.

The present invention relates to a rotating device. The rotating device comprises: a hub on which a magnetic recording disk is to be mounted; a base configured to rotatably support the hub via a bearing; a shaft configured such that it extends along a rotational axis of the hub; and a chassis arranged such that it faces the magnetic recording disk, and configured to have a Young's modulus that is smaller than that of the base. Furthermore, a base hole is provided to a face of the chassis that faces the magnetic recording disk such that it extends along the rotational axis of the hub. The base is fixedly mounted on the chassis by being fitted into the base hole.

Optional combinations of the aforementioned constituting elements and implementations of the invention in the form of methods, apparatuses, or systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention but to exemplify the invention. The size of the component in each figure may be changed in order to aid understanding. Some of the components in each figure may be omitted if they are not important for explanation.

First Embodiment

A rotating device according to a first embodiment is suitably employed as a disk driving apparatus such as a hard disk drive configured to mount a magnetic recording disk, and to rotationally drive the magnetic recording disk thus mounted. In particular, such a rotating device according to the first embodiment is suitably employed as a stationary-shaft disk driving apparatus configured such that its shaft is fixedly mounted on its base so as to allow a hub to be rotationally driven with respect to the shaft.

With the rotating device according to the first embodiment, the base configured to support the driving unit configured to rotationally drive the magnetic recording disk and a chassis configured as a casing of the rotating device are each formed of different materials. Specifically, the base is formed of a material having a greater Young's modulus than that of a material of which the chassis is formed. Such an arrangement allows the rotating device to have a further reduced thickness while maintaining or improving the strength of the base of the driving unit.

Figure 1A:
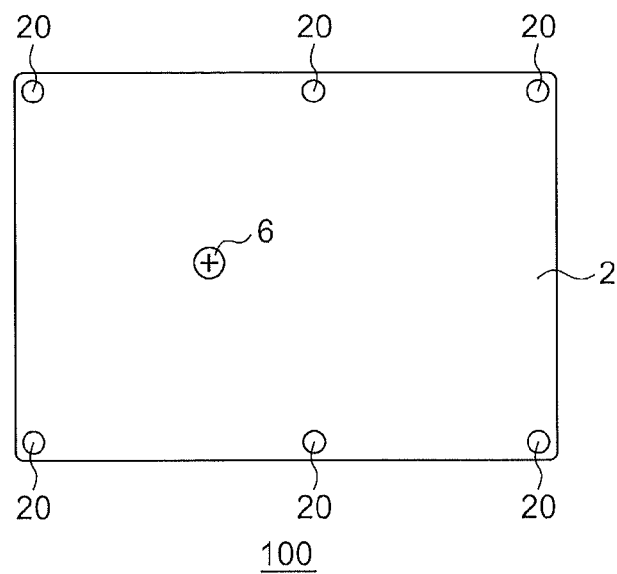
FIGS. 1A, 1B and 1C are diagrams each showing a rotating device according to a first embodiment.
Figure 1B:
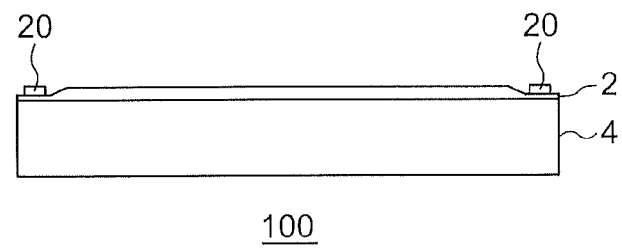
Figure 1C:
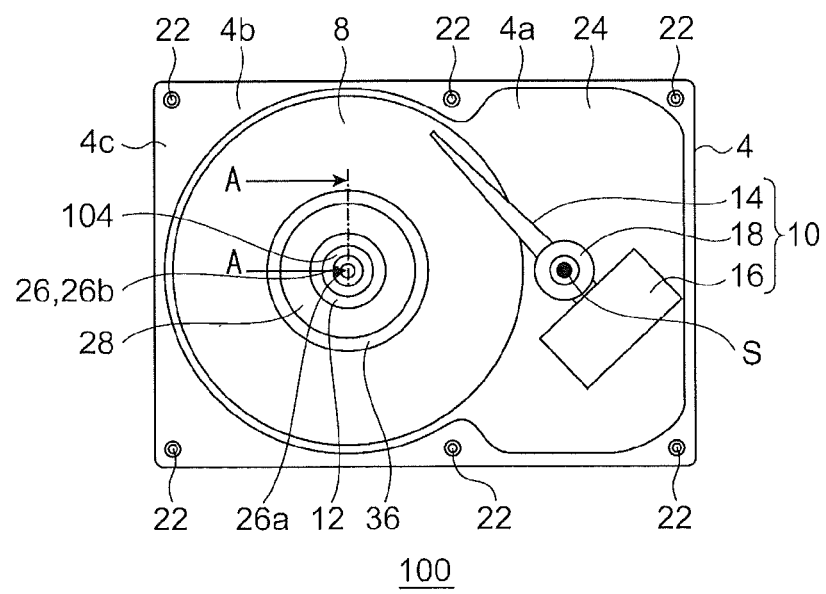

FIGS. 1A, 1B, and 1C are diagrams each showing a rotating device 100 according to the first embodiment. FIG. 1A is a top view of the rotating device 100. FIG. 1B is a side view of the rotating device 100. FIG. 1C is a top view of the rotating device 100 without a top cover 2. The rotating device 100 includes a stator, a rotor configured to rotate with respect to the stator, a magnetic recording disk 8 mounted on the rotor, and a data read/write unit 10. The stator includes a chassis 4, a base 5 (not shown in FIG. 1), a shaft 26 fixedly mounted on the base 5, a top cover 2, six screws 20, and a shaft fixation screw 6. The rotor includes a hub 28 and a clamper 36.

Description will be made below with the side of the chassis 4 on which the hub 28 is mounted as the "upper" side.

The magnetic recording disk 8 is configured as a 2.5-inch magnetic recording disk formed of a glass disk having a diameter of approximately 65 mm, which has a central hole having a diameter of 20 mm, and which has a thickness of 0.65 mm. The hub 28 is configured to mount a single magnetic recording disk 8.

The chassis 4 is formed by molding an aluminum alloy material by means of die casting. The chassis 4 includes a bottom portion 4a that defines the bottom of the rotating device 100, and an outer wall portion 4b formed along the outer edge of the bottom portion 4a so as to surround a mounting region on which the magnetic recording disk 8 is to be mounted. Six screw holes 22 are formed in an upper face 4c of the outer wall portion 4b. Also, the chassis 4 may be formed by press forming a steel plate or aluminum plate.

The data read/write unit 10 includes a record and playback head (not shown), a swing arm 14, a voice coil motor 16, and a pivot assembly 18. The record and playback head is arranged at the end of the swing arm 14, and is configured to record data on the magnetic recording disk 8, and to read out data from the magnetic recording disk 8. The pivot assembly 18 is configured to support the swing arm 14 such that it can be freely swung around the head rotational axis S with respect to the chassis 4. The voice coil motor 16 is configured to swing the swing arm 14 around the head rotational axis S, such that the record and playback head is shifted to a desired position above the face of the magnetic recording disk 8. The voice coil motor 16 and the pivot assembly 18 are each configured using known techniques for controlling the head position.

The top cover 2 is fixedly arranged on the upper face 4c of the outer wall portion 4b of the chassis 4 using the six screws 20. The six screws 20 respectively correspond to the six screw holes 22. Specifically, the top cover 2 and the upper face 4c of the outer wall portion 4b are fixedly coupled to each other such that no leaks to the interior of the rotating device 100 arise via the connection between them. Here, the internal side of the rotating device 100 is a clean-air space 24 surrounded by the bottom portion 4a of the chassis 4, the outer wall portion 4b of the chassis 4, and the top cover 2. The clean-air space 24 is designed so as to be configured as an airtight space such that there is no leak-in from the exterior and no leak-out to the exterior. The clean-air space 24 is filled with clean air after particles are removed from it. Such an arrangement protects the magnetic recording disk 8 from the adherence of contaminants, thereby providing the operation of the rotating device 100 with improved reliability.

The shaft 26 is arranged such that it extends along the rotational axis of the hub 28. A shaft fixation screw hole 26a is provided to an upper end face 26b of the shaft 26. The lower side of the shaft 26 is fixedly arranged on the base as described later. The shaft fixation screw 6 is arranged such that it passes through the top cover 2, and is screwed into the shaft fixation screw hole 26a. Thus, the upper end of the shaft 26 is fixedly arranged with respect to the top cover 2 and the base 4.

Figure 2:
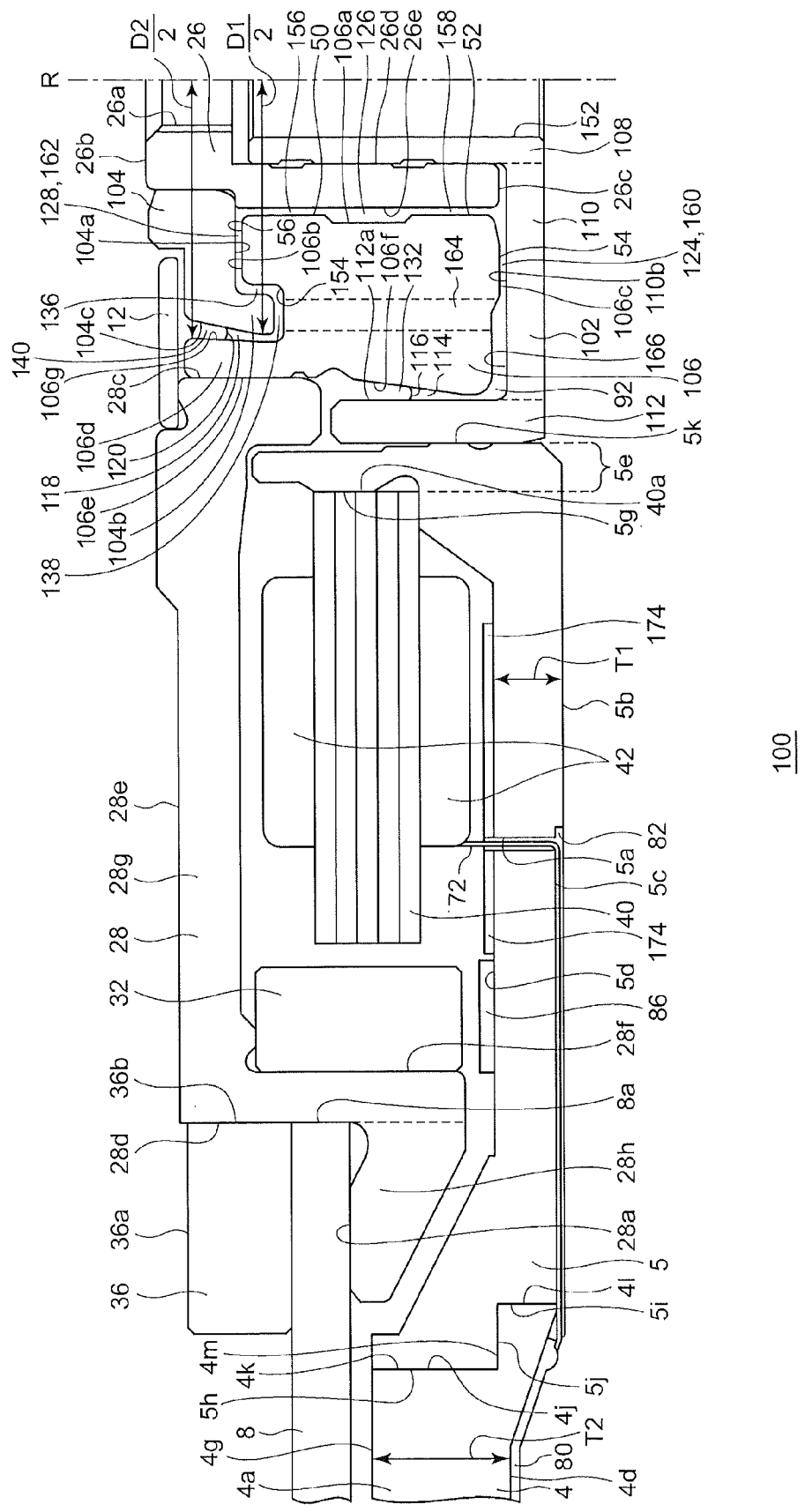
FIG. 2 is a cross-sectional view taken along line A-A in FIG. 1C.

FIG. 2 is a cross-sectional view taken along line A-A in FIG. 10. The cross-sectional view shown in FIG. 2 corresponds to a cross-sectional view of a half section of the driving unit of the rotating device 100.

The rotor includes the hub 28, a clamper 36, a cylindrical magnet 32, a sleeve 106, and a cover ring 12. The stator includes an outer portion, i.e., the base 5, the laminated core 40, a coil 42, an inner portion, i.e., a housing 102, the shaft 26, a ring portion 104, and a flexible printed circuit board 80. A lubricant agent 92 is continuously interposed in a part of the gap between the rotor and the stator.

In the manufacturing of the rotating device 100, a fluid dynamic pressure bearing unit is manufactured such that it is configured including the housing 102, the sleeve 106, the ring portion 104, the lubricant agent 92, and the shaft 26. Next, the hub 28, the base 5, the cover ring 12, and the like, are mounted on the fluid dynamic pressure bearing unit, thereby manufacturing an electric motor unit. The base 5 is configured to rotatably support the hub 28 via the fluid dynamic pressure bearing unit thus manufactured. Subsequently, the motor unit is mounted on the chassis 4, and the magnetic recording disk 8 is mounted on the hub 28, thereby manufacturing the rotating device 100.

The hub 28 is configured to have a predetermined approximately cup-shaped form by machining or press forming a steel material such as SUS430 or the like configured as a soft magnetic material. The hub 28 is configured to have a hub protrusion portion 28g which is to be fitted into central hole 8a of the magnetic recording disk 8, and a disk mounting portion 28h configured such that it extends from the hub protrusion portion 28g along the radial direction. The hub protrusion portion 28g is configured such that a sleeve hole 28c is formed with the rotational axis R as its center. The magnetic recording disk 8 is mounted on the disk mounting face 28a configured as an upper face of the disk mounting portion 28h. The magnetic recording disk 8 is mounted such that it is interleaved between the clamper 36 and the disk mounting portion 28h, thereby fixedly mounting the magnetic recording disk 8 with respect to the hub 28.

The clamper 36 is configured to apply a downward force to the upper face of the magnetic recording disk 8, thereby pressing the magnetic recording disk 8 in contact with the disk mounting face 28a. The clamper 36 is mounted such that it is engaged with the outer face 28d of the hub protrusion portion 28g. The clamper 36 may be coupled with the outer face 28d of the hub protrusion portion 28g using a mechanical coupling method such as screwing, swaging, press fitting, or the like, or using a magnetic coupling method utilizing magnetic attractive force.

The clamper 36 is configured such that the upper face 36a of the clamper 36 does not protrude from the upper face 28e level of the hub protrusion portion 28g in a state in which the clamper 36 applies a desired downward force to the magnetic recording disk 8.

For example, in a case in which the clamper 36 is screwed to the outer face 28d of the hub protrusion portion 28g, a male thread is formed on the outer face 28d of the hub protrusion portion 28g, and a female thread is formed on the inner face 36b of the clamper 36 corresponding to the male thread thus formed. By adjusting the screwing force, such an arrangement is capable of relatively accurately controlling the magnitude of the downward force applied by the clamper 36 to the upper face of the magnetic recording disk 8. The clamper 36 may be formed of multiple members. Alternatively, the clamper 36 may be monolithically formed as a single member.

The cylindrical magnet 32 is fixedly bonded to the inner cylindrical face 28f that corresponds to the inner cylindrical face of the approximately cup-shaped hub 28. The cylindrical magnet 32 is formed of rare earth magnet materials or ferrite magnet materials, for example. With the present embodiment, the cylindrical magnet 32 is formed of neodymium rare earth magnet materials. The cylindrical magnet 32 is configured such that twelve driving magnetic poles are formed in the circumferential direction (direction tangential to a circle having a center that matches the rotational axis R and defined such that it is orthogonal to the rotational axis R). The cylindrical magnet 32 is arranged such that it faces nine salient poles provided to the laminated core 40 in the radial direction (i.e., the direction that is orthogonal to the rotational axis R).

The laminated core 40 has a circular ring portion and nine salient poles, each protruding from the circular ring portion toward the outer side along the radial direction, and is fixed on the upper face 5d side of the base 5. The laminated core 40 is formed by laminating and swaging five thin magnetic steel sheets each having a thickness of 0.2 mm, for example. Also, in some cases, the laminated core 40 is formed by laminating 2 to 20 thin magnetic steel sheets having a thickness ranging between 0.1 mm and 0.8 mm, for example. Electrical insulating coating is applied to the surface of the laminated core 40 by means of electro-coating, powder coating, or the like. The coil 42 is provided to each salient pole of the laminated core 40. By applying a three-phase driving current having an approximately sinusoidal waveform to the coil 42, such an arrangement is capable of generating a driving magnetic flux along each salient pole of the laminated core 40.

Each coil 42 is formed by winding a wire around each salient pole of the laminated core 40 a required number of times. The wire is wound around a given salient pole with the lower side as the winding start position. Subsequently, with such an arrangement configured to perform a three-phase driving operation, the wire is successively wound around the next salient pole that is to function as the same phase pole as that of the previous salient pole, with the upper side as the winding start point. After the wire is wound, the wire is drawn out on the lower side of the salient pole.

Figure 3:
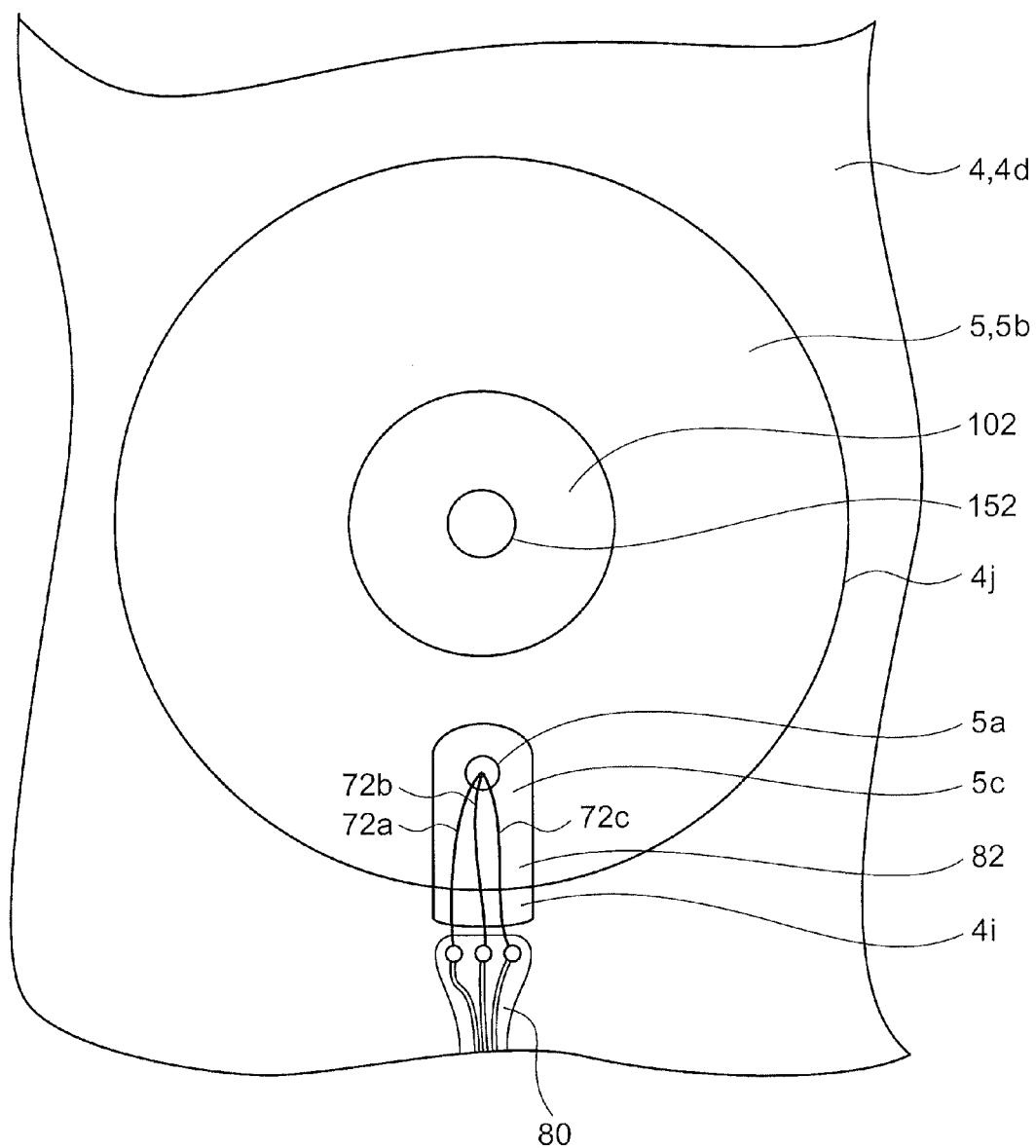
FIG. 3 is a partial diagram showing a lower part of the rotating device shown in FIG. 1A.

FIG. 3 is a partial bottom view showing a part of the bottom of the rotating device 100. After the wire is wound, the wire thus drawn out (which will be referred to as a "wire 72 which is a terminal of the coil 42" hereafter) is further drawn out as a lead terminal on the lower face 5b side via a wire hole 5a formed in the base 5. FIG. 3 shows an arrangement in which three wires 72a, 72b, and 72c, which respectively correspond to the U-phase, V-phase, and W-phase, are arranged such that they pass through a single wire hole 5a.

The wire hole 5a is formed as a through hole that passes through the base 5 from the upper face 5d that faces the coil 42 up to the lower face 5b positioned on the side that is opposite to the upper face 5d. Furthermore, the wire hole 5a is formed such that it passes through a tape 174 described later. The wires 72a, 72b, and 72c are bent after they are drawn out from the wire hole 5a, and are arranged such that they extend along the lower face 5b of the base 5. Specifically, after the wires 72a, 72b, and 72c are drawn out via the wire hole 5a, they are arranged such that they extend outward along the radial direction. A wiring groove 5c is formed in the lower face 5b of the base 5 along the wiring path of the wires 72a, 72b, and 72c. The surface of the wiring groove 5c is subjected to electrical insulating processing. Furthermore, the wiring groove 5c is filled with a curable resin 82 such as an adhesive agent or the like in order to restrict the movement of the wires 72a, 72b, and 72c. The wire hole 5a is also filled with the curable resin 82, thereby sealing the wire hole 5a.

A groove 4i is formed in the lower face 4d of the chassis 4 on the opposite side to the upper face 4g of the bottom portion 4a that faces the magnetic recording disk 8 such that it communicates with the wiring groove 5c. The wires 72a, 72b, and 72c are arranged such that they pass through the groove 4i, and are electrically connected to a corresponding driving circuit configured on the flexible printed circuit board 80. Such connection may be made by soldering. The flexible printed circuit board 80 is bonded to the lower face 4d of the chassis 4.

Returning to FIG. 2, the base 5 is configured to have a ring-shaped base protrusion portion 5e with the rotational axis R of the rotor as its center. The base protrusion portion 5e is configured such that it protrudes toward the hub 28 side so as to surround the housing 102. By fitting the outer face 5g of the base protrusion portion 5e to the central hole 40a of the circular ring portion of the laminated core 40, such an arrangement allows the laminated core 40 to be fixed with respect to the base 5. Specifically, the circular ring portion of the laminated core 40 is press fitted to the base protrusion portion 5e.

An electric insulating sheet or tape 174 formed of resin such as PET or the like is provided to a portion of the upper face 5d of the base 5 that corresponds to the salient poles and the coils 42. Furthermore, a magnetic attracting plate 86 formed of a magnetic material such as iron is provided to a portion of the upper face 5d of the base 5 that faces the cylindrical magnet 32 along the axis (direction that is parallel to the rotational axis R). The magnetic attracting plate 86 is fixedly mounted on the base 5 by swaging or bonding. The magnetic attracting plate 86 is attracted to the cylindrical magnet 32 by a magnetic attractive force. The magnetic attractive force thus generated functions as an additional downward force applied to the cylindrical magnet 32 along the axial direction. This prevents the rotor from rising up when it is rotationally driven.

The base 5 and the chassis 4 are configured as separate units. A base hole 4j is formed in the upper face 4g of the bottom portion 4a of the chassis 4 along the rotational axis R. The base hole 4j is configured as a through hole that passes through the bottom portion 4a. By fitting the base 5 to the base hole 4j, such an arrangement allows the base 5 to be fixed with respect to the chassis 4. The base 5 may be fixedly mounted by press fixing or bonding it to the base hole 4j. Also, a combination of such methods may be employed.

The base hole 4j is configured to have a shape that corresponds to the shape of the outer face of the base 5. Specifically, there is a complementary relation between them. The base hole 4j is configured to have a cylindrical large-diameter hole portion 4k, a cylindrical small-diameter hole portion 4l having a diameter that is smaller than that of the large-diameter hole portion 4k, and a disk-shaped hole contact portion 4m formed between the large-diameter hole portion 4k and the small-diameter hole portion 4l. The outer face of the base 5 is configured to have a large-diameter outer face portion 5h that corresponds to the large-diameter hole portion 4k, i.e., which is to be arranged such that it is in contact with the large-diameter hole portion 4k, a small-diameter outer face portion 5j which is to be arranged such that it is in contact with the small-diameter hole portion 4l, and the outer face contact portion 5j which is to be arranged such that it is in contact with the hole contact portion 4m. The base 5 is inserted into the base hole 4j until the outer face contact portion 5j comes to be in contact with the hole contact portion 4m, thereby fitting the base 5 to the base hole 4j. Such an arrangement allows the base 5 to be aligned with respect to the chassis 4 along the axial direction in a simpler manner, as compared with an arrangement having a straight base hole. Furthermore, such an arrangement provides an increased contact area in which the base hole 4j and the outer face of the base 5 are in contact with each other. Thus, in particular, in a case in which the base 5 and the chassis 4 are coupled by bonding, such an arrangement is capable of reducing leaks passing through the base hole 4j.

The base 5 is molded by press forming a base material such as a non-magnetic stainless steel such as SUS303, and is further cut, thereby manufacturing the base 5. In some cases, the base 5 is formed by cutting instead of press forming. Such an arrangement provides the base 5 with a strength that is higher than that of the chassis 4 formed of aluminum. Specifically, the base 5 is configured to have a Young's modulus that is greater than that of the chassis 4. Typically, stainless steel has a Young's modulus of approximately 200 (kN/mm$^2$). On the other hand, aluminum typically has a Young's modulus of approximately 70 (kN/mm$^2$).

Also, the base 5 may be configured such that the cylindrical magnet 32 is magnetically attracted to the base 5, instead of the base 5 being formed of a non-magnetic material. For example, the base 5 may be formed of a magnetic material such as SUS430. In this case, the base 5 is configured to magnetically attract the cylindrical magnet 32, thereby providing stable positioning of the hub 28. This provides improved rotational-driving performance of the rotating device 100.

The base 5 is configured to have a surface layer formed by electroless nickel plating. Such an arrangement is capable of preventing the detachment of microscopic residue adhered to the machining face.

The base 5 is configured to have a size along the axial direction, i.e., a thickness, which exhibits its smallest value at a portion of the base 5 that faces the coil 42 along the axial direction. With the smallest thickness at this portion as T1, and the thickness of a portion of the bottom portion 4a that faces the magnetic recording disk 8 along the axial direction as T2, the relation T1<T2 holds true.

The housing 102 is configured to have a flat circular housing bottom portion 110, a cylindrical base side circular surrounding portion 112 fixedly arranged on the outer face side of the housing bottom portion 110, and a cylindrical support protrusion portion 108 fixedly arranged on the inner face side of the housing bottom portion 110. The housing 102 is configured to support the shaft 26. The housing 102 is configured to define a ring-shaped support recessed portion 166 so as to allow the lower ends of the shaft 26 and the sleeve 106 to be inserted.

The base side circular surrounding portion 112 is arranged such that it is surrounded by the base protrusion portion 5e. Specifically, the base side circular surrounding portion 112 is fitted to a bearing hole 5k formed in the base as a through hole having a center that matches the rotational axis R, and is fixed to the bearing hole 5k by bonding. The base 5 and the housing 102 are configured as separate units.

A support hole 26d is formed in the lower end face 26c of the shaft 26 along the rotational axis R. The shaft fixation screw hole 26a and the support hole 26d are configured such that they communicate with each other. That is to say, the shaft 26 has a hollow structure. The support protrusion portion 108 is inserted into the support hole 26d, thereby fixedly arranging the support protrusion portion 108. Specifically, the support protrusion portion 108 is fixedly arranged by means of a combination of press fitting and bonding to the support hole 26d. Also, the shaft fixation screw hole 26a and the support hole 26d may be configured such that they do not communicate with each other, i.e., may be configured to each have separate internal spaces.

A through hole 152 is formed in the support protrusion portion 108 along the rotational axis R. Alternatively, the support protrusion portion may have no through hole 152. Also, the support protrusion portion 108 may be configured to have a screw hole into which the shaft fixation screw 6 is to be screwed, instead of the through hole 152.

The ring portion 104 is fixed to the shaft 26 such that it surrounds the upper end side of the shaft 26. The ring portion 104 is fixedly arranged by means of combination of press fitting and bonding to the shaft 26. The adhesive agent is applied to the gap between the ring portion 104 and the shaft 26, thereby sealing the gap between them. Thus, the adhesive agent thus applied functions as a seal material which prevents the lubricant agent 92 from leaking out.

The sleeve 106 is arranged such that it surrounds the intermediate portion of the shaft 26 that is coupled with the support protrusion portion 108. Furthermore, the lubricant agent 92 is interleaved between the sleeve 106 and the intermediate portion of the shaft 26. That is to say, an inner face 106a of the sleeve 106 faces an outer face 26e of the intermediate portion of the shaft 26 via a first gap 126, which is filled with the lubricant agent 92.

The sleeve 106 is arranged between the ring portion 104 and the housing 102 such that it extends along the axial direction. The lubricant agent 92 is applied to the gap between the sleeve 106 and the ring portion 104 and the gap between the sleeve 106 and the housing 102. That is to say, an upper face 106b of the sleeve 106 faces a lower face 104a of the ring portion 104 via a second gap 128, which is filled with the lubricant agent 92. Furthermore, a lower face 106c of the sleeve 106 faces an upper face 110b of the housing bottom portion 110 via a third gap 124, which is filled with the lubricant agent 92.

The hub 28 is fixedly arranged on an outer face 106e of an upper portion 106d of the sleeve 106 by means of a combination of press fitting and bonding. The base side circular surrounding portion 112 and the sleeve 106 are arranged to have a position relation in which the base side surrounding portion 112 surrounds the lower portion of the sleeve 106.

A first tapered sealing portion 114 is defined as the gap between the base side circular surrounding portion 112 and the sleeve 106. That is to say, the first tapered sealing portion 114 is configured as a fourth gap 132 between the inner face 112a of the base side circular surrounding portion 112 and the outer face 106f of the lower portion of the sleeve 106, configured such that it gradually extends outward as it approaches the upper side. Specifically, the base side circular surrounding portion 112 is configured such that its inner face 112a is arranged approximately in parallel with the rotational axis R, and such that the sleeve 106 is configured such that the outer face 106f of the lower portion thereof has a reduced diameter as it approaches the upper side, thereby providing the first tapered sealing portion 114 having a tapered shape. The first tapered sealing portion 114 is configured to provide the lubricant agent 92 with a first gas-liquid interface 116, thereby using the capillary action to prevent the lubricant agent 92 from leaking out. Thus, the lubricant agent 92 is interleaved at at least a part of the gap between the base side surrounding portion 112 and the sleeve 106. The first gas-liquid interface 116 of the lubricant agent 92 is arranged such that it is in contact with both the inner face 112a of the base side circular surrounding portion 112 and the outer face 106f of the lower portion of the sleeve 106.

A circular sleeve recessed portion 154 is formed in the upper face 106b of the sleeve 106 such that it has a center that matches the rotational axis R. The sleeve recessed portion 154 is configured such that it is recessed downward. The ring portion 104 is configured to have a ring insertion portion 104b which is to be inserted into the sleeve recessed portion 154. By inserting the ring insertion portion 104b into the sleeve recessed portion 154, a gap is defined between the sleeve recessed portion 154 and the ring insertion portion 104b, with the ring insertion portion 104b facing the sleeve recessed portion 154. Specifically, the gap thus defined has a seventh gap 136 and a ninth gap 140 with the ring insertion portion 104b and the sleeve recessed portion 154 facing each other in the radial direction, and an eighth gap 138 with the ring insertion portion 104b and the sleeve recessed portion 154 facing each other along the axial direction. Here, the ninth gap 140 is positioned on the outside of the seventh gap 136 along the radial direction.

The sleeve 106 is arranged such that its upper portion 106d surrounds the ring insertion portion 104b. A second tapered sealing portion 118 is formed between the upper portion 106d of the sleeve 106 and the ring insertion portion 104b. The second tapered sealing portion 118 is configured as a ninth gap 140 between them such that it gradually extends as it approaches the upper side. Specifically, the inner face 106g of the upper portion 106d and the outer face 104c of the ring insertion portion 104b are each configured such that its diameter becomes smaller as it approaches the upper side. Furthermore, the diameter of the inner face 106g of the upper portion 106d becomes smaller at a rate that is smaller than that at which the diameter of the outer face 104c of the ring insertion portion 104b becomes smaller. Thus, such an arrangement provides the second tapered sealing portion 118 with a tapered shape. When the rotor is rotated, an outward force is applied to the lubricant agent 92 in the radial direction due to centrifugal force. Because the upper portion 106d is formed such that its inner face 106g has a diameter that is smaller as it approaches the upper side, the force is applied to the lubricant agent 92 such that it is drawn downward.

Specifically, the ring portion 104 is formed such that the maximum diameter D1 of the outer face 104c of the ring insertion portion 104b is smaller than the minimum diameter D2 of the inner face 106g of the upper portion 106d. Thus, in the manufacturing, such an arrangement allows the ring portion 104 to be mounted on the shaft 26 more smoothly in a state in which the sleeve 106 is loosely fit to the shaft 26.

The second tapered sealing portion 118 is configured to have a second gas-liquid interface 120 of the lubricant agent 92, thereby using the capillary action to prevent the lubricant agent 92 from leaking out. The lubricant agent 92 is arranged such that its second gas-liquid interface 120 is in contact with both the inner face 106g of the upper portion 106d and the outer face 104c of the ring insertion portion 104b.

The first gap 126 is configured to have two radial dynamic pressure generating portions 156 and 158 configured to apply radial dynamic pressure to the lubricant agent 92 along the radial direction when the sleeve 106 is rotated with respect to the shaft 26. The two radial dynamic pressure generating portions 156 and 158 are arranged as separate portions at a predetermined interval along the axial direction. Specifically, the first radial dynamic pressure generating portion 156 is arranged above the second radial dynamic pressure generating portion 158. With such an arrangement, a first radial dynamic pressure generating groove 50 and a second radial dynamic pressure generating groove 52, each having a herringbone structure or a spiral structure, are formed at the respective portions of the inner face 106a of the sleeve 106 that correspond to the two radial dynamic pressure generating portions 156 and 158. It should be noted that at least one of the first radial dynamic pressure generating groove 50 and the second radial dynamic pressure generating groove 52 may be formed in the outer face 26e of the intermediate portion of the shaft 26, instead of the inner face 106a of the sleeve 106.

The third gap 124 is configured to have a first thrust dynamic pressure generating portion 160 configured to apply axial dynamic pressure to the lubricant agent 92 when the sleeve 106 is rotated with respect to the shaft 26. With such an arrangement, a first thrust dynamic pressure generating groove 54 having a herringbone structure or a spiral structure is formed at a portion of the lower face 106c of the sleeve 106 that corresponds to the first thrust dynamic pressure generating portion 160. Also, the first thrust dynamic pressure generating groove 54 may be formed in the upper face 110b of the housing bottom portion 110, instead of the lower face 106c of the sleeve 106.

The second gap 128 is configured to have a second thrust dynamic pressure generating portion 162 configured to apply axial dynamic pressure to the lubricant agent 92 when the sleeve 106 is rotated with respect to the shaft 26. With such an arrangement, a second thrust dynamic pressure generating groove 56 having a herringbone structure or a spiral structure is formed at a portion of the upper face 106b of the sleeve 106 that corresponds to the second thrust dynamic pressure generating portion 162. Also, the second thrust dynamic pressure generating groove 56 may be formed in the lower face 104a of the ring portion 104, instead of the upper face 106b of the sleeve 106.

When the rotor is rotated relative to the stator, dynamic pressure is applied to the lubricant agent 92 by means of the first radial dynamic pressure generating groove 50, the second radial dynamic pressure generating groove 52, the first thrust dynamic pressure generating groove 54, and the second thrust dynamic pressure generating groove 56. By applying such dynamic pressure thus generated, the rotor is supported in a contactless manner both radially and axially.

A bypass communicating hole 164 is formed in the sleeve 106, and is configured to bypass the second thrust dynamic pressure generating portion 162, the first radial dynamic pressure generating portion 156, the second radial dynamic pressure generating portion 158, and the first thrust dynamic pressure generating portion 160. The bypass communicating hole 164 is configured such that one terminal thereof is positioned at the eighth gap 138, and the other end thereof is positioned between the first thrust dynamic pressure generating portion 160 and the first tapered sealing portion 114. The bypass communicating hole 164 is configured as a through hole formed in the sleeve 106 along the axial direction.

The cover ring 12 is fixedly mounted on the hub 28 by means of bonding such that it covers the second gas-liquid interface 120 existing in the ninth gap 140.

Description will be made regarding the rotating device 100 thus configured as described above. In order to rotationally drive the magnetic recording disk 8, a three-phase driving current is supplied to the coil 42. When the driving current flows through the coil 42, a magnetic flux occurs along each of the nine salient poles. The magnetic flux thus generated provides a torque to the cylindrical magnet 32, thereby rotationally driving the rotor and the magnetic recording disk 8 fitted to the rotor. At the same time, the swing arm 14 is swung by means of the voice coil motor 16, and the record and playback head is swung back and forth in the swinging range above the magnetic recording disk 8. The record and playback head is configured to convert magnetic data recorded on the magnetic recording disk 8 into an electrical signal, and to transmit the electric signal thus converted to a control board (not shown). Furthermore, the record and playback head is configured to receive data transmitted in the form of an electric signal from the control board, and to write the data thus received on the magnetic recording disk 8 in the form of magnetic data.

With the rotating device 100 according to the present embodiment, the base 5 and the chassis 4 are configured as separate units. Furthermore, the base 5 is formed of a harder material. Thus, such an arrangement allows the base 5 to be designed to have a reduced thickness while maintaining or improving the strength of the base 5, as compared with an arrangement in which the base 5 and the chassis 4 are formed of the same material. Thus, such an arrangement allows the driving unit of the rotating device 100 to have a reduced thickness. This contributes to an advantage of a reduction in the overall thickness of the rotating device 100.

Furthermore, the chassis 4 is formed of a softer material. Thus, such an arrangement facilitates the machining of the chassis 4, as compared with an arrangement in which the chassis is formed of a material of the same strength as that of the base 5.

As a result of configuring the chassis 4 and the base 5 as separate units, such an arrangement provides a rotating device 100 having a thickness of 8 mm or less. More preferably, such an arrangement provides a rotating device 100 having a thickness of 6 mm or less.

Furthermore, with the rotating device 100 according to the present embodiment, the second gas-liquid interface 120 of the lubricant agent 92 is exists in the ninth gap 140. That is to say, such an arrangement allows the tapered sealing portion and the radial dynamic pressure generating portion to be positioned in an overlapping manner along the axial direction. Such an arrangement allows the distance between the first radial dynamic pressure generating portion 156 and the second radial dynamic pressure generating portion 158 along the axial direction, i.e., the bearing span, to be increased, without largely being limited by the length of the tapered sealing portion. This provides the bearing with improved radial rigidity.

Conversely, such an arrangement allows the tapered sealing portion to have an increased length, without largely being limited by the bearing span. Such an arrangement allows a sufficient amount of the lubricant agent 92 to be retained while suppressing dispersion loss of the lubricant agent 92. Also, in a case in which a sufficient amount of the lubricant agent 92 to be retained is small, such an arrangement allows the ninth gap 140 and the fourth gap 132 to be narrowed according to the reduction in the amount of the lubricant agent 92. This provides an increase in the capillary force, thereby reducing the leaking-out of the lubricant agent 92 due to shock, for example.

As described above, such a tapered sealing portion is capable of sufficiently suppressing dispersion loss of the lubricant agent 92. Thus, such an arrangement is capable of maintaining at a low level the likelihood of dispersion loss of the lubricant agent 92 due to irregularity in the dynamic pressure thus generated even if the first radial dynamic pressure generating portion 156 and the second radial dynamic pressure generating portion 158 are each configured to have an increased length along the axial direction so as to provide increased radial dynamic pressure. Thus, such an arrangement is capable of further raising the radial dynamic pressure while suppressing the dispersion loss of the lubricant agent 92, thereby providing the bearing with improved rigidity.

It should be noted that a typical arrangement configured to raise the radial dynamic pressure in order to provide improved bearing rigidity involves increased power consumption due to energy loss at the bearing. However, in principle, such an arrangement configured to extend the bearing span in order to provide bearing rigidity does not involve such energy loss.

In particular, in a case in which the thickness of the rotating device is stipulated in a standard or the like, or in a case in which there is a strong demand for such a rotating device having a reduced thickness, with the rotating device 100 according to the present embodiment, such an arrangement allows the length of both the bearing span and the tapered sealing portion to be determined approximately independently of each other such that they are maximized according to the stipulated thickness of the rotating device 100.

Thus, such an arrangement provides a rotating device having a small thickness with a bearing having improved rigidity, thereby maintaining a low error rate. At the same time, by providing such a tapered sealing portion so as to be deep, such an arrangement provides a rotating device which is capable of maintaining a sufficient amount of the lubricant agent 92 for a relatively long period of use.

In a case in which a clamper on the hub or a screw is arranged on the hub in order to fix a clamper to the hub, such a component is disadvantageous in the reduction of the thickness. In order to solve such a problem, with the rotating device 100 according to the present embodiment, the magnetic recording disk 8 is interleaved between the clamper engaged with the outer face 28*d* of the hub protrusion portion 28*g* and the mounting portion 28*h*, thereby fixedly mounting the magnetic recording disk 8 on the hub 28. Thus, such an arrangement allows the rotating device to have a further reduced thickness according to the thickness of the clamper, as compared with an arrangement in which the clamper and the like are fixedly mounted on the hub. Furthermore, such an arrangement provides another advantage of suppressing deformation of the hub 28 itself.

Second Embodiment

Figure 4:
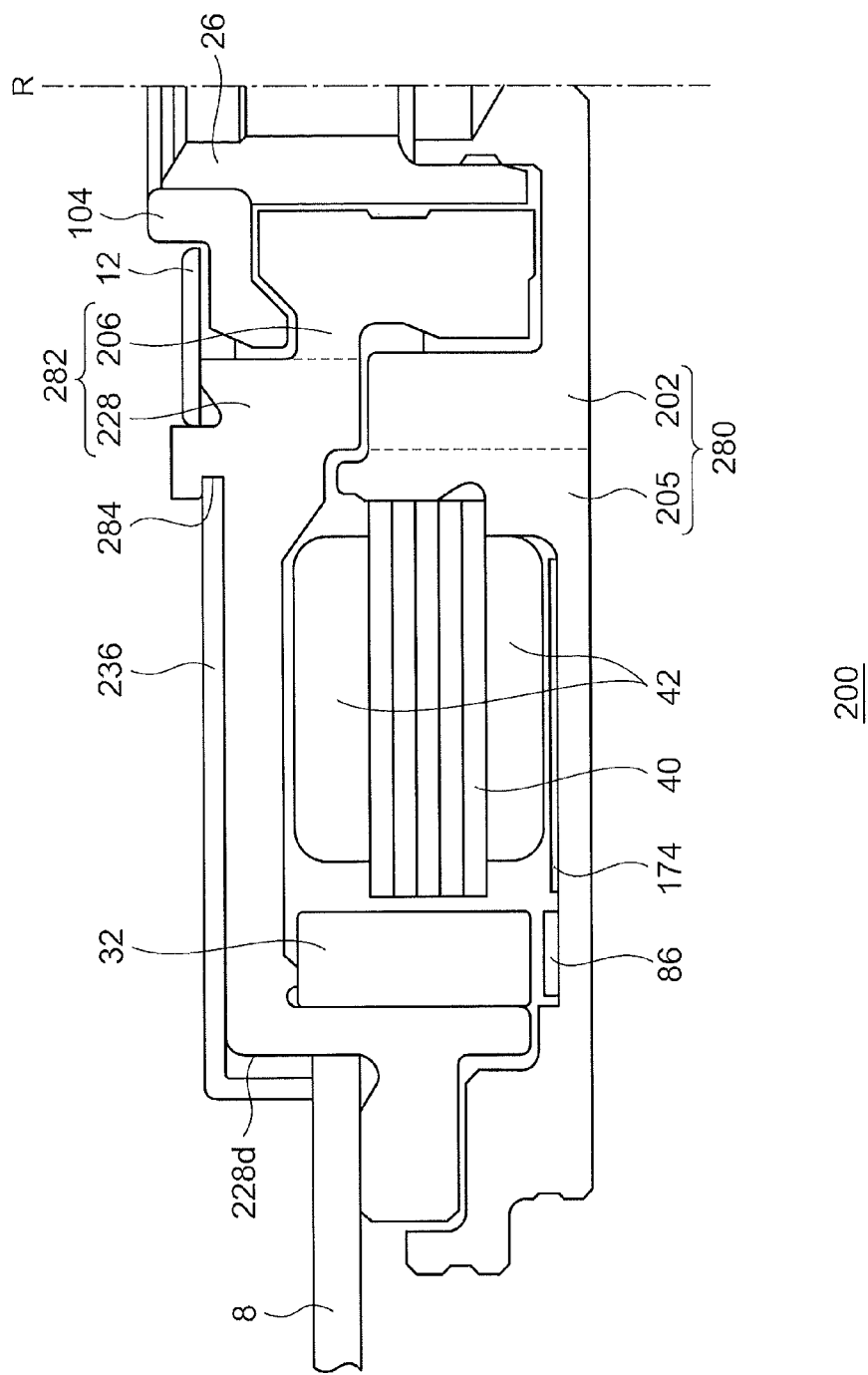
FIG. 4 is a partial cross-sectional view showing a driving unit of a rotating device according to a second embodiment.

FIG. 4 is a partial cross-sectional diagram showing a driving unit of a rotating device 200 according to a second embodiment. FIG. 4 basically corresponds to FIG. 2 except that FIG. 4 does not show the chassis. The main points of difference between the rotating device 200 according to the second embodiment and the rotating device 100 according to the first embodiment are the base structure, the hub structure, and the clamper structure.

The driving unit of the rotating device 200 includes a base 280, a magnetic attracting plate 86, a tape 174, a shaft 26, a ring portion 104, a laminated core 40, a coil 42, a hub 282, a cover ring 12, a cylindrical magnet 32, and a clamper 236.

The base 280 is configured to have an outer portion 205 that corresponds to the base 5 according to the first embodiment, and an inner portion 202 that corresponds to the housing 102 according to the first embodiment. The outer portion 205 and the inner portion 202 are monolithically formed as a single unit. The hub 282 is configured to have an outer portion 228 that corresponds to the hub 28 according to the first embodiment, and an inner portion 206 that corresponds to the sleeve 106 according to the first embodiment. The outer portion 228 and the inner portion 206 are monolithically formed as a single unit.

A circular clamper recessed portion 284 is provided to the outer portion 228 of the hub 282 on the inner side, i.e., on the side that is closer to the rotational axis R side than is the outer face 228*d* with which the central hole of the magnetic recording disk 8 is to come into contact. Also, the clamper recessed portion 284 may be formed as a recess that is recessed along the axial direction, along the radial direction, or otherwise along a direction that is inclined with respect to the rotational axis R, for example. The inner edge of the clamper 236 having an approximately disk-shaped structure is fit to the clamper recessed portion 284. Here, the inner edge of the clamper 236 is configured to have a structure that corresponds to the structure of the clamper recessed portion 284. For example, in a case in which the clamper recessed portion is configured as a recess that is recessed along the axial direction, the clamper may be configured such that its inner edge is bent along the recess of the clamper, i.e., configured to have a bent portion. The outer edge of the clamper 236 is mounted such that it is pressed in contact with the upper face of the magnetic recording disk 8. The clamper 236 has a spring structure which provides an elastic force. Due to this elastic force, a downward force is applied to the upper face of the magnetic recording disk 8. The clamper 236 may be formed by press forming a plate material such as SUS303, for example.

It should be noted that either the clamper 236 or the hub 282 may be subjected to electroless nickel plating. With the rotating device 200 according to the present embodiment, such an arrangement provides the same effects and advantages as those provided by the rotating device 100 according to the first embodiment. Furthermore, with the present embodiment, there is no need to mount the clamper 236 by means of screwing. Thus, such an arrangement suppresses or otherwise prevents contamination due to chips or shavings that can occur as a consequence of screwing.

Description has been made regarding the configurations and the operations of the rotating devices according to the embodiments. The above-described embodiments have been described for exemplary purposes only, and are by no means intended to be interpreted restrictively. Rather, it can be readily conceived by those skilled in this art that various modifications may be made by making various combinations of the aforementioned components, which are also encompassed in the technical scope of the present invention.

Description has been made in the first and second embodiments regarding a so-called outer rotor type rotating device having a configuration in which the cylindrical magnet 32 is arranged on the outer side of the laminated core 40. However, the present invention is not restricted to such an arrangement. For example, the present invention may be applied to a so-called inner rotor type rotating device having a configuration in which a cylindrical magnet is arranged on the inner side of the laminated core.

Description has been made in the first and second embodiments regarding an arrangement employing a laminated core. However, the core thus employed is not restricted to such a laminated core.

Description has been made in the first and second embodiments regarding a stationary-shaft disk driving device. However, the present invention is not restricted to such an arrangement. Also, the technical conception according to the first or second embodiment may be applied to a rotating-shaft disk driving device having a configuration in which a shaft mounted on a hub is rotationally driven with respect to a sleeve.

Description has been made in the first and second embodiments regarding an arrangement including two thrust dynamic pressure generating portions. However, the present invention is not restricted to such an arrangement. Also, such an arrangement may include a single thrust dynamic pressure generating portion alone. For example, with the first embodiment, the second thrust dynamic pressure generating groove 56 may be omitted.

Description will be made below regarding an example of the size of each component according to the first and second embodiments. In particular, the first and second embodiments can be suitably applied to a so-called 2.5-inch or 3.5-inch hard disk driving apparatus having an axial thickness of 12.7 mm or less. In a case in which the first or second embodiment is applied to such a 2.5-inch hard disk driving apparatus having an axial thickness of approximately 9 mm, the cylindrical magnet 32 may be configured to have an axial thickness ranging between 3.0 mm and 4.2 mm, and the laminated core 40 may be configured to have an axial thickness ranging between 1.4 mm and 3.2 mm, for example. In a case in which the first or second embodiment is applied to such a 2.5-inch hard disk driving apparatus having an axial thickness of approximately 7 mm, the cylindrical magnet 32 may be configured to have an axial thickness ranging between 2.7 mm and 3.9 mm, and the laminated core 40 may be configured to have an axial thickness ranging between 1.2 mm and 3.0 mm, for example. In a case in which the first or second embodiment is applied to such a 2.5-inch hard disk driving apparatus having an axial thickness of approximately 5 mm, the cylindrical magnet 32 may be configured to have an axial thickness ranging between 1.8 mm and 3.0 mm, and the laminated core 40 may be configured to have an axial thickness ranging between 0.6 mm and 2.8 mm, for example. In a case in which the first or second embodiment is applied to such a 2.5-inch hard disk driving apparatus having an axial thickness of approximately 5 mm or less, the cylindrical magnet 32 may be configured to have an axial thickness ranging between 1.6 mm and 2.8 mm, and the laminated core 40 may be configured to have an axial thickness ranging between 0.4 mm and 2.6 mm, for example. It should be noted that the range of sizes for each component has been listed for exemplary purpose only. Rather, it can be readily conceived by those skilled in this art that such components may be configured to have a size outside the range described above, which are also encompassed in the technical scope of the present invention.

What is claimed is:

1. A rotating device comprising:
   a hub on which a magnetic recording disk is to be mounted;
   a base configured to rotatably support the hub via a bearing;
   a shaft configured such that the shaft extends along a rotational axis of the hub; and
   a chassis arranged so as to face the magnetic recording disk, and configured to have a Young's modulus that is smaller than that of the base,
   wherein a base hole is provided to a face of the chassis that faces the magnetic recording disk such that the base hole extends along the rotational axis of the hub,
   wherein the base is fixedly mounted on the chassis by being fitted into the base hole,
   wherein the base is configured to have a circular protrusion portion configured such that the circular protrusion portion protrudes so as to surround the rotational axis of the hub, and
   wherein the rotating device further comprises:
      a core comprising a ring portion fixedly arranged at the circular protrusion portion, and a plurality of salient poles each configured such that the plurality of salient poles radially extend from the ring portion;
      a coil configured by winding a wire around the plurality of salient poles; and
      a magnet fixedly arranged on the hub such that the magnet faces the plurality of salient poles along the radial direction, and configured to have a plurality of magnetic poles along a circumferential direction of the magnet.

2. The rotating device according to claim 1, wherein the base is configured to have:
   an outer portion in which an opening is provided along the rotational axis of the hub; and
   an inner portion which is fitted into the opening.

3. The rotating device according to claim 2, wherein the outer portion and the inner portion are configured as separate units.

4. The rotating device according to claim 2, wherein the inner portion is configured to support the shaft, and to define, together with the shaft, a first recessed portion having a circular shape,
    wherein the rotating device further comprises:
        a first circular surrounding portion fixedly arranged on the hub such that the first circular surrounding portion surrounds the shaft, and such that one end side of the first circular surrounding portion is inserted into the first recessed portion; and
        a second circular surrounding portion arranged on the other end side of the first surrounding portion such that the second circular surrounding portion surrounds and is fixed to the shaft,
    wherein a second recessed portion having a circular shape is formed at the other end face of the first circular surrounding portion, and
    wherein the second circular surrounding portion is configured to have an insertion portion which is inserted into the second recessed portion.

5. The rotating device according to claim 4, wherein, from among the two gaps defined by the insertion portion and the second recessed portion that face each other along the radial direction, the outer-side gap is configured such that the outer-side gap's extent increases with an increase in the distance from the base.

6. The rotating device according to claim 1, wherein a portion of the chassis that faces the magnetic recording disk is configured to have a thickness that is greater than that of a portion of the base that faces the coil.

7. The rotating device according to claim 1, wherein the base is configured such that the magnet is attracted to the base by a magnetic effect.

8. The rotating device according to claim 1, further comprising a wiring member arranged on a face of the chassis that is opposite to the face of the chassis that faces the magnetic recording disk,
    wherein the base is provided with a wire hole configured to communicate between a face of the base that faces the coil and another face that is the other face side of the base, and
    wherein a wire configured as one terminal of the coil is drawn out to the other face side of the base via the wire hole, is arranged along the other face of the base, and is connected to the wiring member.

9. The rotating device according to claim 1, wherein the base hole is configured as a through hole that passes through the chassis.

10. The rotating device according to claim 1, wherein the rotating device is configured to have a thickness of 8 mm or less.

11. The rotating device according to claim 1, wherein the shaft is configured to stand erect on the base.

12. A rotating device comprising:
    a hub configured to have a hub protrusion portion which is fitted into a central hole of a magnetic recording disk, and a mounting portion arranged on the outside of the hub protrusion portion along the radial direction;
    a clamper arranged such that the clamper is coupled with an outer face of the hub protrusion portion by screwing, or otherwise by swaging, or yet otherwise by press fitting;
    a base configured to rotatably support the hub via a bearing;
    a shaft arranged such that the shaft extends along a rotational axis of the hub; and
    a chassis arranged such that the chassis faces the magnetic recording disk,
    wherein a base hole is provided to a face of the chassis that faces the magnetic recording disk such that the base hole extends along the rotational axis of the hub,
    wherein the base is fixedly mounted on the chassis by fitting the base into the base hole,
    wherein the base is configured to have a circular protrusion portion configured such that the circular protrusion portion protrudes so as to surround the rotational axis of the hub, and
    wherein the rotating device further comprises:
        a core comprising a ring portion fixedly arranged at the circular protrusion portion, and a plurality of salient poles each configured such that the plurality of salient poles radially extend from the ring portion;
        a coil configured by winding a wire around the plurality of salient poles; and
        a magnet fixedly arranged on the hub such that the magnet faces the plurality of salient poles along the radial direction, and configured to have a plurality of magnetic poles along a circumferential direction of the magnet.

13. The rotating device according to claim 12, wherein the bearing comprises two radial dynamic pressure generating portions configured to apply a dynamic pressure to a lubricant agent along the radial direction when the hub is rotated with respect to the base, and
    wherein the clamper is coupled with the outer face of the hub protrusion portion such that a lower end of the clamper overlaps the radial dynamic pressure generating portions along the axial direction.

14. The rotating device according to claim 12, wherein the bearing is configured as a fluid dynamic pressure bearing configured to apply a fluid dynamic pressure to a lubricant agent with which a predetermined region is filled, and
    wherein at least one gas-liquid interface of the lubricant agent overlaps the clamper coupled with the outer face of the hub protrusion portion along the axial direction.

15. The rotating device according to claim 12, wherein the bearing is configured as a fluid dynamic pressure bearing configured to apply a fluid dynamic pressure to a lubricant agent with which a predetermined region is filled, and
    wherein the damper is coupled with the outer face of the hub protrusion portion such that a lower end of the damper overlaps a region filled with the lubricant agent along the axial direction.

16. The rotating device according to claim 12, wherein a portion of the chassis that faces the magnetic recording disk is configured to have a thickness that is greater than that of a portion of the base that faces the coil.

17. The rotating device according to claim 12, wherein the base is configured such that the magnet is attracted to the base by a magnetic effect.

18. The rotating device according to claim 12, further comprising a wiring member arranged on a face of the chassis that is opposite to the face of the chassis that faces the magnetic recording disk,
    wherein the base is provided with a wire hole configured to communicate between a face of the base that faces the coil and another face that is the other face side of the base, and
    wherein a wire configured as one terminal of the coil is drawn out to the other face side of the base via the wire hole, is arranged along the other face of the base, and is connected to the wiring member.

19. A rotating device comprising:
    a hub on which a magnetic recording disk is to be mounted;
    a base configured to rotatably support the hub via a bearing;

a shaft configured such that the shaft extends along a rotational axis of the hub; and a chassis arranged such that the chassis faces the magnetic recording disk, and configured to have a Young's modulus that is smaller than that of the base, wherein a base hole is provided to a face of the chassis that faces the magnetic recording disk such that the base hole extends along the rotational axis of the hub, wherein the base is fixedly mounted on the chassis by being fitted into the base hole, wherein the base is configured to have:
an outer portion in which an opening is provided along the rotational axis of the hub; and
an inner portion which is fitted into the opening, wherein the inner portion is configured to support the shaft, and to define, together with the shaft, a first recessed portion having a circular shape, wherein the rotating device further comprises:
a first circular surrounding portion fixedly arranged on the hub such that the first circular surrounding portion surrounds the shaft, and such that one end side of the first circular surrounding portion is inserted into the first recessed portion; and
a second circular surrounding portion arranged on the other end side of the first surrounding portion such that the second circular surrounding portion surrounds and is fixed to the shaft, wherein a second recessed portion having a circular shape is formed at the other end face of the first circular surrounding portion, and wherein the second circular surrounding portion is configured to have an insertion portion which is inserted into the second recessed portion.

20. The rotating device according to claim 19, wherein, from among the two gaps defined by the insertion portion and the second recessed portion that face each other along the radial direction, the outer-side gap is configured such that the outer-side gap's extent increases with an increase in the distance from the base.

* * * * *